(12) United States Patent
Liu et al.

(10) Patent No.: US 9,910,638 B1
(45) Date of Patent: Mar. 6, 2018

(54) COMPUTER-BASED SQUARE ROOT AND DIVISION OPERATIONS

(71) Applicant: Advanced Micro Devices, Inc., Sunnyvale, CA (US)

(72) Inventors: Hanbing Liu, Austin, TX (US); John Kelley, Fort Collins, CO (US); Michael Estlick, Fort Collins, CO (US); Erik Swanson, Fort Collins, CO (US); Jay Fleischman, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 15/247,416

(22) Filed: Aug. 25, 2016

(51) Int. Cl.
*G06F 7/38* (2006.01)
*G06F 7/552* (2006.01)
*G06F 7/535* (2006.01)

(52) U.S. Cl.
CPC ............ *G06F 7/5525* (2013.01); *G06F 7/535* (2013.01); *G06F 2207/5523* (2013.01)

(58) Field of Classification Search
CPC ............................. G06F 7/5525; G06F 7/535
USPC ......................................................... 708/605
See application file for complete search history.

(56) References Cited

U.S. PATENT DOCUMENTS

2003/0126175 A1* 7/2003 Kurd ................... G06F 7/5525
708/510
2004/0230630 A1* 11/2004 Ebergen ............... G06F 7/5525
708/500

OTHER PUBLICATIONS

Lang, T. et al., "Very High Radix Square Root with Prescaling and Rounding and a Combined Division/Square Root Unit", IEEE Transactions on Computers, Aug. 1999, pp. 827-841, vol. 48, Issue 8, IEEE, USA.
IEEE Standard for Floating Point Arithmetic, IEEE Std. 754-2008, Aug. 29, 2008, 70 pgs., IEEE, New York, NY, USA.

* cited by examiner

*Primary Examiner* — Tan V. Mai
(74) *Attorney, Agent, or Firm* — Volpe and Koenig, P.C.

(57) ABSTRACT

Square root operations in a computer processor are disclosed. A first iteration for calculating partial results of a square root operation is performed in a larger number of cycles than remaining iterations. The first iteration requires calculation of a first digit that is larger than the subsequent digits. The first iteration thus requires multiplication of values that are larger than corresponding values for the subsequent other digits. By splitting the first digit into two parts, the required multiplications can be performed in less time than if the first digit were not split. Performing these multiplications in less time reduces the total delay for clock cycles associated with the first digit calculations, which increases the possible clock frequency allowed. A multiply-and-accumulate unit that performs either packed-single operations or double-precision operations may be used, along with a combined division/square root unit for simultaneous execution of division and square root operations.

20 Claims, 9 Drawing Sheets

COMPUTER-BASED SQUARE ROOT AND DIVISION OPERATIONS

BACKGROUND

Many microprocessors support hardware-implemented square root calculations. Because of the complexity of such calculations, much work has gone into improving performance of such calculations, including the speed with which such calculations complete, the chip area of hardware required to perform such calculations, and other aspects. A combined division and square root unit has been developed that uses at least some of the same hardware to perform both square root and division operations, which allows for a compact implementation of both operations.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to improved square root operations in a computer processor. More specifically, a first iteration for calculating partial results of a square root operation is performed in a large number of cycles than remaining iterations. The first iteration requires calculation of a first digit that is larger than the subsequent digits. The first iteration thus requires multiplication of values that are larger than corresponding values for the subsequent other digits. By splitting the first digit into two parts, the required multiplications can be performed in less time than if the first digit were not split. Performing these multiplications in less time reduces the total delay for clock cycles associated with the first digit calculations, which increases the possible clock frequency allowed. Other improvements also include an improved multiply-and-accumulate unit for performance of either packed-single operations or double-precision operations, and improvements to a combined division/square root (also referred to as "div/sqrt" unit herein) unit that allow for simultaneous execution of division and square root operations.

Figure 1:
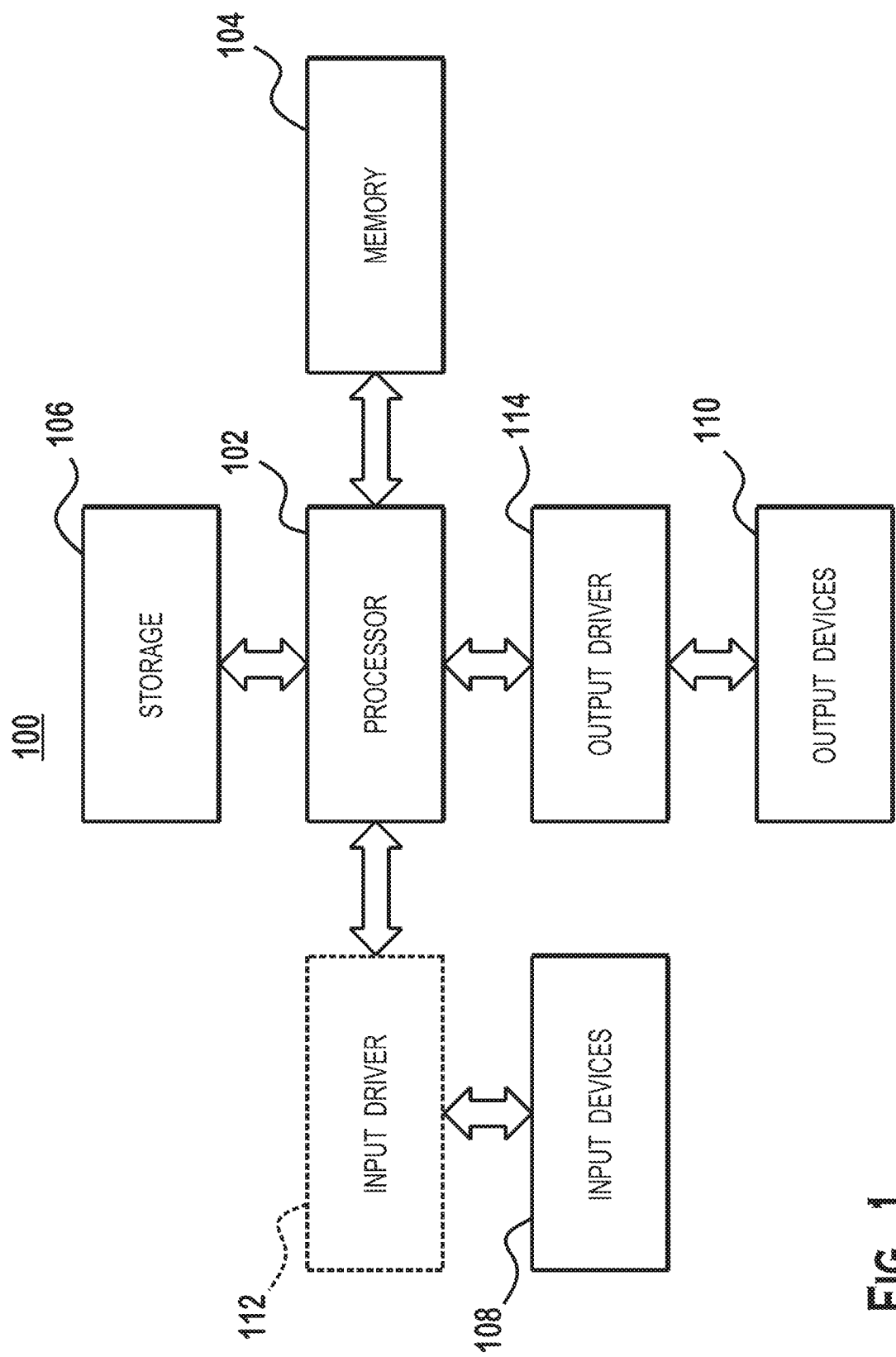
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), or any other input device. The output devices 110 include a display, a speaker, a printer, a haptic feedback device, one or more lights, an antenna, or a network connection (e.g., a wireless local area network card for transmission and/or reception of wireless IEEE 802 signals), or any other output devices.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
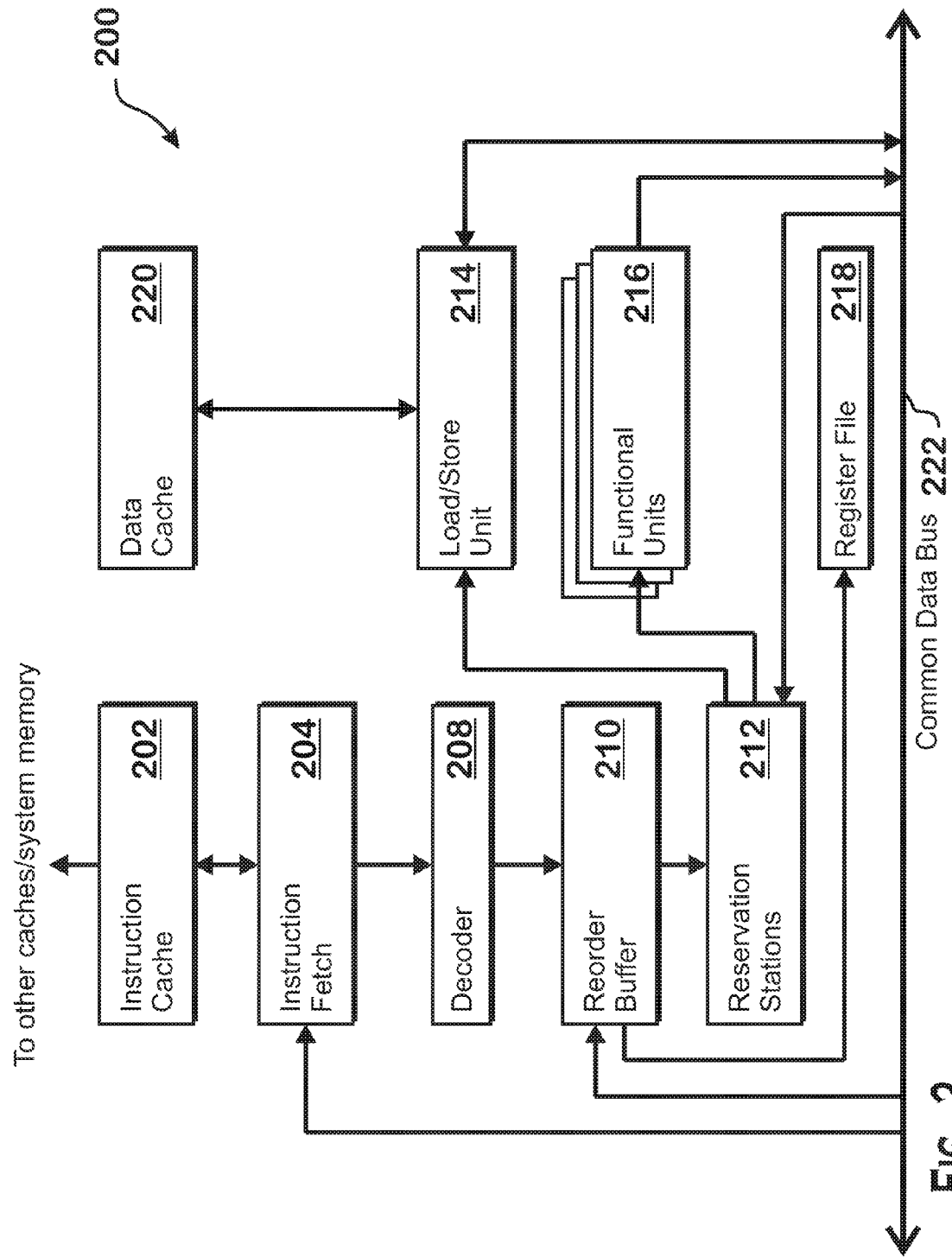
FIG. 2 is a block diagram of an instruction execution pipeline, located within the processor of FIG. 1.

FIG. 2 is a block diagram of an instruction execution pipeline 200, located within the processor 102 of FIG. 1. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load/store unit 214, configured to load data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. (Instructions are in-flight between the time the instructions reach the reorder buffer 210 and the time the instructions leave the reorder buffer 210 and results are retired to the architectural state such as the register file 218.) Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer 210.

Various elements of the instruction execution pipeline 200 communicate via a common data bus 222. For example, the functional units 216 and load/store unit 214 write results to the common data bus 222 which is read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and write the results to memory via the data cache 220 for store instructions.

Figure 3:
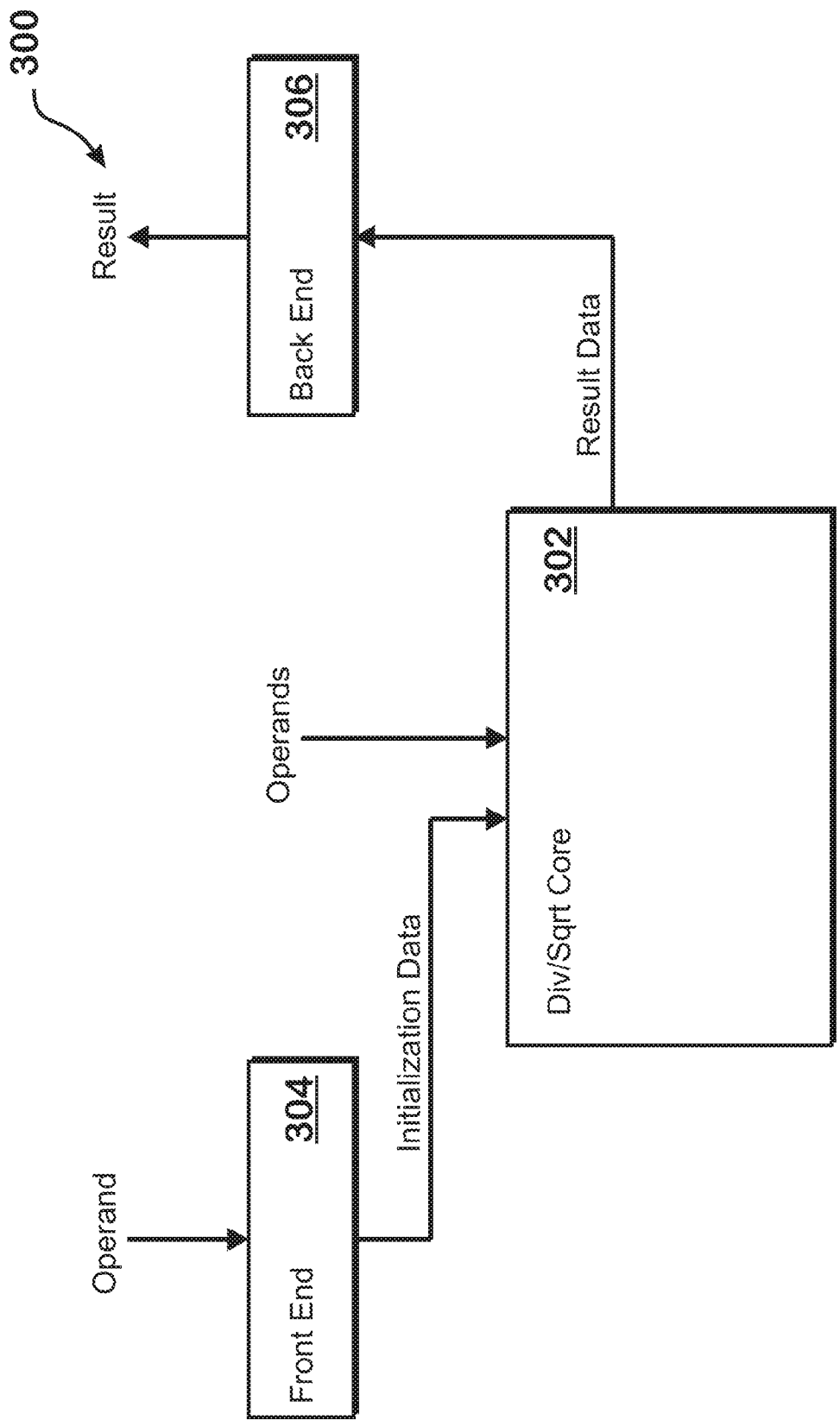
FIG. 3 is a block diagram illustrating a combined division/square root calculation unit, according to an example.

FIG. 3 is a block diagram illustrating a combined division/square root calculation unit 300 ("div/sqrt unit"), according to an example. The div/sqrt unit 300 is a combined unit that executes division and square root operations for instructions executed by the instruction execution pipeline 200. For example, a division instruction requests calculation of a division result based on two operands, and in response, the div/sqrt unit 300 performs calculations to obtain such a result. The div/sqrt unit 300 is included within one or more of the functional units 216 of FIG. 2.

The div/sqrt unit 300 includes a division/square root core 302 ("div/sqrt core"), a front end 304, and a back end 306. The front end 304 accepts operands, performs initialization operations, and provides initialization data to the div/sqrt core 302. The div/sqrt core 302 accepts the initialization data and the operands, performs calculations on the initialization data and on input operands to obtain result data, and provides the result data to the back end 306. The back end 306 processes the result data and outputs a final result based on the result data.

The div/sqrt unit 300 implements an iterative, numerical approach to division and square root operations. More specifically, after certain initialization operations, the div/sqrt core 302 performs different iterations of the same calculation, each iteration producing different intermediate results. Multiple iterations are performed for any given division or square root operation. The back end 306 combines at least some of the intermediate results into a final result for output.

The div/sqrt core 302 includes different hardware elements, each performing individual portions of the iterative calculation. The square root and division calculations are implemented in such a way that various hardware elements of the div/sqrt core 302 can be shared for both division and square root operations.

The initialization operations performed by the front end unit include calculation of a scaling factor (referred to as "M" herein), performance of denormal operations for "normalizing" floating point operations by removing leading zeroes in the significand, performance of special "short cut" operations like operations related to division by zero or division by "not-a-number," and may also perform other operations. The purpose of the scaling factor is to simplify a portion of the calculation as discussed in greater detail below. The back end unit 306 collects intermediate results produced by the core 302 and outputs a final result when ready. An example implementation of the div/sqrt unit 300 is now described with respect to FIG. 4A.

Figure 4A:
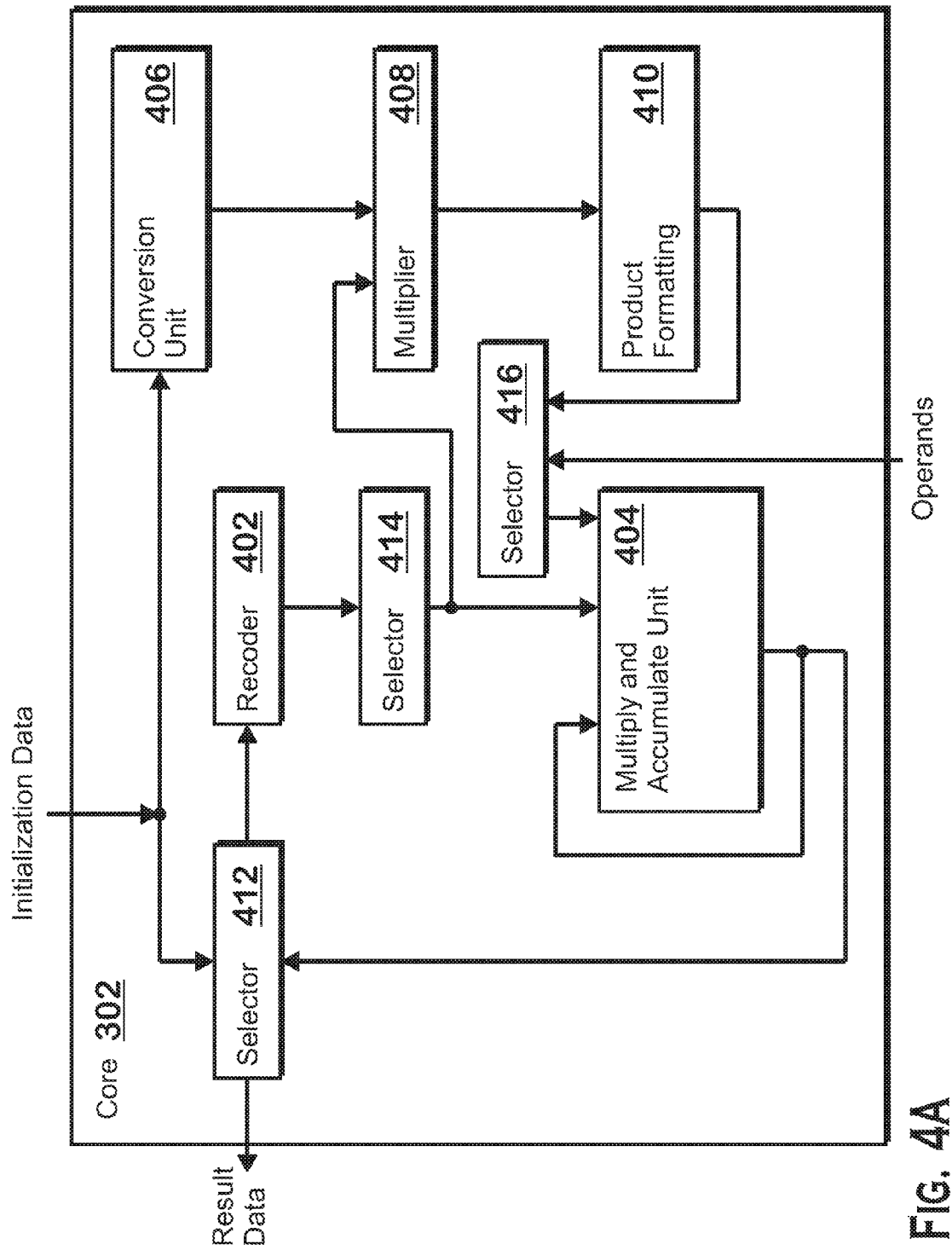
FIG. 4A is a block diagram illustrating details of a division/square root core of the combined division/square root calculation unit of FIG. 3, according to an example.

FIG. 4A is a block diagram illustrating details of the div/sqrt core 302, according to an example. As shown, the div/sqrt core 302 includes a recoder unit 402, a multiply and accumulate unit 404 ("MAC unit"), a conversion unit 406, a multiplier 408, a product formatting unit 410, a first selector 412, a second selector 414, and a third selector 416. The recoder unit 402 includes a hardware unit including hardware logic elements and configured to convert two-vector carry-save representations of numbers into Booth digits (where Booth digits, as is known, are numerical representations useful for performing multiplication operations). The conversion unit 406 includes a hardware unit including hardware logic elements and configured to convert carry-save format numbers into single-vector representation numbers (e.g., "normal binary" representations of numbers). The multiplier 408 includes a hardware unit including hardware logic elements configured to multiply two numbers. The product formatting unit 410 includes various hardware logic elements including shifters, adders, multiplexors, and others, configured to perform various operations as disclosed herein. The selectors 412, 414, 416 include multiplexors and may also include shifters for performing operations to multiply by powers of 2 as described herein. The div/sqrt core 302 receives initialization data from the front end 304, receives operands, and outputs result data to the back end 306.

The div/sqrt core 302 implements a square root calculation with the following features: a high radix, prescaling, and rounding. A radix is the numerical base of the number system in which the calculations are performs. (Examples of radixes are 10 for the decimal system and 2 for the binary system). A high radix is used for performance reasons. The square root calculation calculates one digit per calculation iteration. By increasing the size of the digit (where "size" refers to the number of bits that store a digit), the portion of the square root that can be calculated each iteration is increased. The "iterations" do not necessarily correspond to clock cycles. Prescaling allows each digit to be selected (i.e., obtained from other calculated data) by rounding, rather than through some more complicated technique (i.e., the act of rounding means adding the value ½ and taking the floor of the result). To implement prescaling, the front end unit 304 calculates a pre-scaling factor ("M") which is used throughout the calculations as further described below.

For calculating square root, the iteration implemented by the div/sqrt core 302 for calculating the jth digit of the square root $s_{j+1}$ and the jth residual value w[j] is:
1. selection function and recoding of $s_{j+1}$;
2. computation of $t_{j+1}=Ms_{j+1}$;
3. computation of $2^{-1}t_{j+1}s_{j+1}r^{-J}$
4. addition to produce w[j+1] in carry-save form as follows: $w[j+1]=rw[j]-T[j]s_{j+1}-2^{-1}t_{j+1}s_{j+1}r^{-J}$, where:
   j is the iteration index;
   $s_j$ is the jth digit of the square root;
   $t_j$ is the scaled (by M) jth digit of the square root;
   M is the pre-scaling factor (also referred to herein as a "scaling factor");
   r is the radix and is equal to $2^b$;
   $J=j+g$, where $g=\log_r(2^k)$;
   k is the number of bits of the first square root digit $s_1$; and
   w[j] is the "residual" value at the jth iteration.

The "residual" value can be thought of as a left-over numerical value that remains after the jth square root digit is extracted from the calculations for the jth iteration. The residual value for any particular iteration is used in a subsequent iteration to obtain the square root digit for that subsequent iteration. Thus, the residual value may also be thought of as an intermediate value from which subsequent digits of the square root result are obtained. Additional details of this square root calculation can be found in the paper "Very High Radix Square Root with Prescaling and Rounding and a Combined Division/Square Root Unit," by Thomas Lang and Paolo Montuschi, IEEE Transactions on Computers, Vol. 48, No. 8, August 1999 (referred to here as "the combined division/square root unit paper"), which is hereby incorporated by reference herein.

In microprocessor operations, the clock frequency generally characterizes the speed of the microprocessor. A higher clock frequency is associated with faster operation. However, a higher clock frequency imposes stricter timing requirements on every operation within the microprocessor, including those related to square root calculations. More specifically, for any particular clock frequency, all operations to be performed in a single clock cycle must be performed in an amount of time that is smaller than the clock period (1/frequency). To fit the above square root calculations into a small cycle time, delay of the iteration is reduced by implementing the iteration in two cycles as follows:

Cycle A:
1. selection function and recoding of $s_{j+1}$;
2. computation of $v[j+1]=rw[j]-T[j]s_{j+1}$;
3. computation of $t_{j+1}=Ms_{j+1}$, leaving the result in carry-save form;

Cycle B:
1. summing the two vectors of the carry-save form of $t_{j+1}$ to produce $t_{j+1}$ in assimilated form;
2. computation of $w[j+1]=v[j+1]-2^{-1}t_{j+1}s_{j+1}r^{-J}$;
3. computation of $T[j+1]=T[j]+t_{j+1}r^{-J}$ in assimilated form, where:
v[j] is an intermediate result used for calculating w[j];
S[j] is the square root estimate at the jth iteration; and
T[j] is the scaled square root estimate at the jth iteration=MS[j].

Cycle A, operation 1—the "selection function"—is performed by rounding an intermediate value equal to the truncated residual from the previous cycle multiplied by r: round(trunc(rw[j]))=floor(trunc(rw[j])+½), where "truncation" refers to the operation of removing enough significant bits such that the result has a small enough number of bits to fit into a single digit of base r (e.g., 9 bits when a radix of $2^9$ is used). The first selector 412 outputs result data to the back end 306 for accumulation into the square root estimate SW.

Cycle A, operation 2—computation of $v[j+1]=rw[j]-T[j]s_{j+1}$—is performed at the MAC unit 404 because this operation includes adding a first value (rw[j]) to the product of a second value (T[j]) and a third value ($s_{j+1}$). (Either the second value or the third value can be negated to achieve the indicated subtraction). The first value (rw[j]) is obtained by bit-shifting, by a number of bits equal to the side of the radix r, the value w[j] calculated by the MAC unit 404 in a previous iteration (cycle B, operation 2) and stored in an appropriate register (not shown). The value w[j+1] represents the residual from the "next" iteration as compared with w[j], which is why calculation of v in iteration number j+1 uses the value w[j]. The second value T[j] is calculated by the multiplier 408 and the product formatting unit 410, in cycle B, operation 3 from the previous iteration and will be discussed below. The third value $s_{j+1}$ is obtained in cycle A, operation 1, by the selector 412, as described above.

Cycle A, operation 3, which calculates $t_{j+1}$, is performed by scaling the value $s_{j+1}$ by the value M. This scaling is performed by the multiplier 408, which multiplies the value M (received as initialization data from the front end 304) by the value $s_{j+1}$. The value M is stored in an appropriate register in between the conversion unit 406 and the multiplier 408 after being received from the front end unit 304. The recoder 402 converts the value $s_{j+1}$ to Booth digits for use in the multiplier 408, and the selector 414 selects the recoded $s_{j+1}$ value for output to the multiplier 408. The output of the multiplier 408 ($t_{j+1}$) is in carry-save form at the end of operation 3.

Cycle B, operation 1, which computes the accumulated version of $t_{j+1}$, is performed by the product formatting unit 410. The product formatting unit 410 includes a conversion unit to add the two vectors of the carry-save form of $t_{j+1}$ to obtain a single vector, assimilated form (i.e., "standard" binary representation) representation of $t_{j+1}$ for use in the MAC unit 404.

Cycle B, operation 2 calculates w[j+1] as $v[j+1]-2^{-1}t_{j+1}s_{j+1}r^{-J}$. This operation is performed by the MAC unit 404 due to the combination of multiplication and addition. The term v[j+1] is calculated by the MAC unit 404 in cycle A, operation 2 as described above, and is fed back into the MAC unit 404 for cycle B, operation 2. The term $t_{j+1}$ is calculated by the multiplier 408 and product formatting unit 410 and selected by the selector 416, as described above, and is fed to the MAC unit 404 as described above. The term $s_{j+1}$ is produced by the selector 412 in a rounding operation as described above and is converted to Booth digits by the recoder 402, selected by the selector 414, and fed to the MAC unit 404 for cycle B, operation 2. The products $2^{-1}$ and $r^{-J}$ represent shifting factors and are applied to $t_{j+1}$ by shifting the bits of $t_{j+1}$ downward by 1+bJ bits ($r=2^b$)). This shifting is performed by appropriate shifting hardware (not shown) prior to the selector 416. The multiply and accumulate unit 404 receives each of these values and performs the appropriate multiply and add operation to obtain the result of w[j+1].

Cycle B, operation 3 calculates $T[j+1]=T[j]+t_{j+1}r^{-J}$ in assimilated form. Conceptually, this operation can be thought of as accumulating the "next" digit of the scaled square root result into the current scaled estimate of the square root (S[j] is the estimate of the square root result at the jth iteration and T[j]=Ms[j], is the scaled estimate of the square root result at the jth iteration). To "accumulate" this digit, this operation adds a shifted right version of the scaled square root digit for the j+1th iteration ($t_{j+1}$) to the current scaled estimate of the square root T[j]. Cycle B, operation 3 is performed by an adder in the product formatting unit 410. More specifically, T[j] is stored in a register, not shown, in the product formatting unit 410, and $t_{j+1}r^{-J}$ is obtained by scaling, by $r^{-J}$, the value of $t_{j+1}$ as received from the multiplier 408. As described above, $t_{j+1}$ is produced by the multiplier 408 in cycle B, operation 1. Scaling by $r^{-J}$ is performed by shifting $t_{j+1}$ right by bJ bits, where b=$\log_2 r$, or the number of bits required to represent a single digit.

The above describes the recurrent relationships between iterations. Initial values are also needed for the calculations, and include $s_1$, S[0], T[0], w[0], and w[1]. S[0] and T[0] are 0. w[0]—the initial value for the residual value—is 4Mx, where x is the original value to be square-rooted. w[1]—the first iteration of the residual value—is calculated in a different manner than w[j+1] and requires a larger number of bits than the calculation for w[j+1]. Because the number of bits required for the calculation determines the total time ("delay" across logic elements) required for the calculation, and because clock speed is based on the maximum delay of any operation, calculation of w[1] in the same manner as w[j+1] (i.e., in two clock cycles) limits the clock speed. Thus, it is desirable to reduce the total cycle delay for operations for the calculation of w[1]. Reduction of calculation delay is performed by splitting up the calculation of w[1] into multiple operations such that these operations can performed in different clock cycles. The number of clock cycles for calculating w[1] is greater than the number of clock cycles for calculating w[j+1]. For example, w[1] may take 4 clock cycles while w[j+1] may take 2 clock cycles.

Calculation of w[1] involves calculating $2^k w[0] - 2^{-1} s_1^2 2^{-k}$, where w[0] is equal to 4Mx and is considered an "initial value" for the residual value. To reduce delay time associated with this calculation and improve clock cycle period, this operation is split into four operations, as follows:

$$T[0a] = Ms_{1a} 2^{-8};  \quad 1)$$

$$w[0a] = 2^5 * 4Mx - 1/2 * Ms_{1a} s_{1a} 2^{-8};  \quad 2)$$

$$T[1] = T[0a] + Ms_{1b} 2^{-12};  \quad 3)$$

and $$w[1] = 2^4 w[0a] - T[0a] s_{1b} - 1/2 Ms_{1b} s_{1b} 2^{-12} = 2^4 w[0a] - 1/2 T[1](s_{1b}).  \quad 4)$$

where $s_1 = s_{1a} 2^4 + s_{1b}$; and $s_1 = \text{floor}(\text{trunc}(2^k Mx) + 1/2)$.

By splitting the computation into four cycles, the delay for each cycle is reduced, which allows for a reduced cycle period and prevents the first iteration of residual calculation (w[1]) from being a bottleneck in terms of cycle period. This "splitting" works because of the polynomial expansion $s_1^2 = (2^8 s_{1a}^2 + 2 s_{1a} s_{1b} 2^4 + s_{1b}^2)$ due to the rules of polynomial multiplication. Thus:

$$w[1] = 2^k 4Mx - 2^{-1} s_1^2 2^{-k}$$
$$= 2^k 4Mx - 2^{-1} 2^{-k} (2^8 s_{1a}^2 + 2 s_{1a} s_{1b} 2^4 + s_{1b}^2),$$

which is equivalent to the above expression for w[1].

Note that the value $s_1$ is split to produce multiplications that require fewer bits to perform, and assumes a specific split of $s_1$ into 4 least significant bits and the remainder as most significant bits. This splitting is what leads to the reduction in delay associated with the calculation of the first iteration w[1]. The split is accomplished by splitting $s_1$ into most significant bits ($s_{1a}$) and least significant bits (sib). With $s_1$ expressed in Booth digits, such a split includes a split between B−2 most significant Booth digits and 2 least significant Booth digits, where B is the total number of Booth digits in $s_1$. (Note that $s_1$ is represented as the sum of $s_{1b}$ and $s_{1a} 2^4$, because $s_{1a}$ is "shifted left" by 2 Booth digits). In alternatives, $s_1$ may be split into different numbers of Booth digits, with appropriate modifications to the calculations for w[0a], T[0a], w[1], and T[1] being based on the different "formula" for $s_1$ (e.g., for B−3 and 3 booth digits, $s_1 = s_{1a} 2^6 + s_{1b}$) and the appropriate polynomial expansion.

Splitting the $s_1$ value leads to a reduction in delay because the formula for w[1] does not require the multiplication $s_1^2$ or, indeed, multiplication of $s_1$ by anything (only $s_{1a}$ or $s_{1b}$ are multiplied by other values). Thus, the delay for multiplications involving these terms is reduced as compared with the multiplication $s_1^2$ (or multiplying $s_1$ by any other value such as T in the "split" w[ ] calculation described above). This reduced delay allows for a faster overall clock speed as well as a reduced size MAC unit (since the size of the MAC unit is related to the size of numbers being multiplied).

The polynomial expansion of the split expression for $s_1$ allows for the calculation of the first iteration of the residual value (w[1]) to be divided into multiple cycles because that polynomial expansion introduces additional terms that can simply be added together for calculating w[1]. More specifically, the "unsplit" calculation for w[1], which is $2^k 4Mx - 2^{-1} s_1^2 2^{-k}$ has two terms that are added together, where one term involves multiplication ($s_1^2$), noting that the 4Mx term involves multiplication but is calculated previously for the initial value w[0] and that multiplications by 2 to a certain power is performed by a simple bit shifting and does not require more complicated multiplication hardware. The "split" calculation for w[1] requires more combined multiplication/addition operations (i.e., the operation performed by a MAC unit), where each term can be performed in a different cycle. Though these terms are calculated in different cycles, resulting in more total cycles than the "unsplit" calculation for w[1], the total delay for each cycle is reduced by reducing the bit-width required for the MAC unit, which allows the clock speed to increase.

This splitting concept may be used regardless of the specific formula for calculating w[1]. For example, any other formula for calculating w[1] that requires squaring $s_1$ can be improved as explained above by splitting $s_1$ into constituent parts and splitting the calculation for w[1] further operations.

The calculations discussed above (for w[0a], T[0a], w[1], and T[1]) are performed in the hardware of FIG. 4 as follows. The multiplier 408 calculates $T[0a] = Ms_{1a} 2^{-8}$ in a first cycle by multiplying M with $s_{1a}$ and multiplying by the $2^{-8}$ factor via bitshifting left by 8 bits (either or both of the operands and/or the result may be shifted). The result travels through the product formatting unit 410, which adds the result to T[0], which is 0, and outputs that result to the selector 416 for application to the MAC unit 404.

The MAC unit 404 calculates w[0a] in a second cycle as follows. The MAC unit 404 receives the value 4Mx (calculated in a previous cycle) shifted left by 5 bits. The MAC unit 404 also receives the value $Ms_{1a} 2^{-8}$ from the multiplier 408. The MAC unit 404 also receives the term $s_{1a}$ from the selector 414. The term −1*(½) is applied to one or both of the $s_{1a}$ operands by shifting and negating operands appropriately (for example, this term may be applied to the term received from the multiplier 408 by shifting that term right by 1 bit and negating the result). The MAC unit 404 applies the multiply and combine (a multiplication and addition) to obtain the result w[0a].

For T[1], the multiplier 408 multiplies M by $s_{1b}$ and applies bit shifting for the $2^{-12}$ factor to obtain $Ms_{1b} 2^{-12}$. The product formatting unit 410 adds T[0a] to $Ms_{1b} 2^{-12}$ to obtain T[1]. These operations occur in a third cycle. For w[1], the MAC unit 404 shifts w[0a] left by 4 bits, shifts T[1] right by 1 bit and negates T[1], and multiples the modified T[1] term by sib. These operations occur in a fourth cycle. Note that operations described as being performed in a third cycle and in a fourth cycle can instead be performed together in a third cycle because different hardware is used. Subsequent iterations are performed as discussed above.

The scaling value M is calculated so that MS[j]=T[j] is approximately equal to 1, so that the digit s can be obtained by rounding: $s_{j+1} = \text{floor}(y+1/2)$, where y is the truncation of rw[j] in carry-save form. The term truncation refers to removing the least significant bits such that the result fits within the number of bits allotted to a digit $s_{j+1}$. Adding ½ and then applying the floor function rounds the value. M can also be thought of as follows: Mx is an approximation of √x such that $S[1] = 2^{-k} s_1 \approx Mx$. In one example, the front end 304 calculates M in accordance with any of the approaches described in the combined division/square root unit paper discussed above.

The combined div/sqrt unit 300 also implements the division operation with shared hardware, iteratively calculating the residual value $w[j]=rw[j]-q_{j+1}z$, as follows:

1. selection function and recoding of $q_{j+1}$ (performed by the selector unit 412 and the recoder 402);
2. computation of $q_{j+1}z$ (MAC unit 404); and
3. redundant addition to produce $w[j+1]=rw[j]-q_{j+1}z$ in carry save form (MAC unit 404)

with each of these operations performed in the same cycle, where:

$q_{j+1}$ is the j+1th digit of the quotient;
z=Md; and
d=divisor.

It can be seen that division uses similar hardware as the square root operations. Additional details of division operations can be found in the combined division/square root unit paper.

Figure 4B:
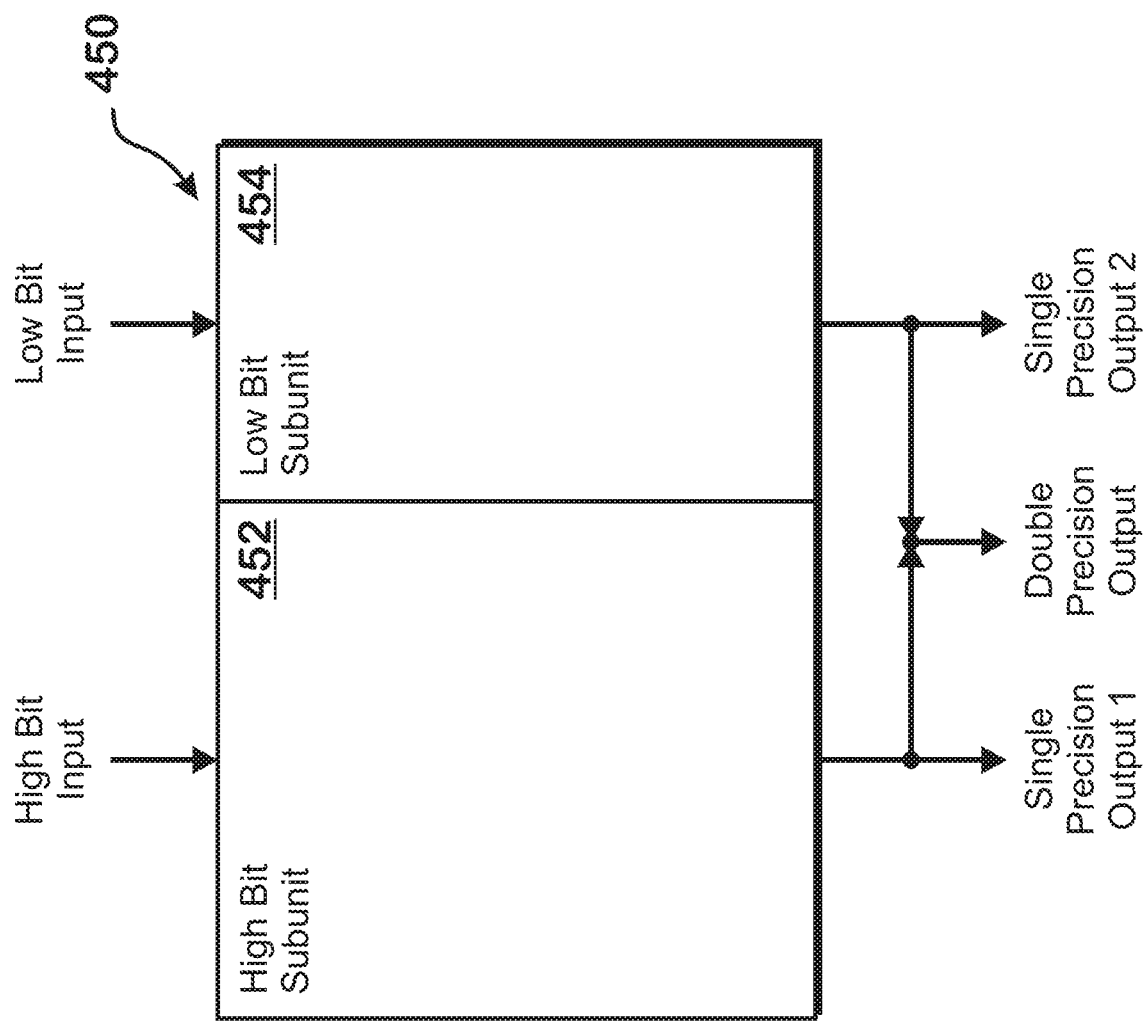
FIG. 4B is a block diagram of a combined packed single/double precision multiply-and-accumulate unit of the division/square root core of FIG. 4A, according to an example.

FIG. 4B is a block diagram of a combined packed single/double precision MAC unit 450 (also referred to as a "single/double MAC unit or an "SD MAC unit" herein), according to an example. In the following discussion, the term "operand" refers to the value that is to be square-rooted (i.e., "x" in the above discussion). The SD MAC unit 450 is configured to perform multiply-and-accumulate operations for the square root calculations described above, for both packed-single precision formats and for double-precision formats. More specifically, the combined division/square root (div/sqrt) unit 300 is able to calculate the square root in two different formats. In a first format—a double-precision format—the div/sqrt unit 300 calculates a single square root result for a double-precision operand. In one example, the double-precision operand has 64 bits and the result also has 64 bits. In other examples, the operand and results may have different numbers of bits. In a second format—a packed-single precision format—the div/sqrt unit 300 calculates two square root results for two single-precision numbers that are arranged (i.e., "packed") into a single array of bits. In some examples, the single-precision operands and results have 32 bits, while in other examples, the operands and results have different numbers of bits that are less than the number of bits for the double-precision operands and results.

To support the packed-single format, each element of the core, except for the MAC unit 404, is duplicated (i.e., each such unit is included twice). For example, the recoder 402 is doubled, the selectors are doubled, the conversion unit 406 is doubled, the multiplier 408 is doubled, and the product formatting unit 410 is doubled. In some versions of the div/sqrt unit 300, the back end 306 and front end 304 are doubled to support the packed-single format while in other versions, the back end 306 and front end 304 perform their operations serially, one for each of the operands in the combined packed-single format operand. The recoder 402, selectors 412-416, conversion unit 406, and multiplier 408, are doubled to allow for calculation of operand-specific values. For example, the value M is different for two different single-precision numbers. Thus, two multipliers 408 are used to multiply M by the digits $s_j$ (which are also different for the different single-precision numbers) to get t, for example. Similarly, two recoders 402 are used so that Booth-digit versions of values are calculated for each single-precision operand. Duplicate versions of other hardware are included for analogous reasons. The purpose of duplicating these units is so that operations for both single-precision numbers can be performed simultaneously with different values appropriate for the individual calculations.

The MAC unit 404 does not need to be fully duplicated. Instead, in the example of FIG. 4B, a modified version of the MAC unit 450 is presented which is able to perform either a full-length multiply-and-combine operation for double-precision input or two single-precision multiply-and-combine operations.

The minimum "width" (number of logic elements and thus number of bits that can be supported) for a MAC unit depends on the bit-length of the operands being processed by the MAC unit. Thus, a MAC unit for supporting single-precision operands can be less wide than a MAC unit for supporting double-precision operands. Therefore, in one approach, instead of fully doubling the MAC unit, a second MAC unit can be added that is smaller than the first MAC unit, the second MAC unit being sized to support single precision operands and the first MAC unit being sized to support double precision operands. In this approach, in double-precision mode, all MAC calculations would be performed by the first MAC unit and the second MAC unit would be unused. In packed single-precision mode, MAC calculations for each single-precision operand would be performed by the different MAC units. Note that the first MAC unit is wider than necessary for the first single-precision mode but the second MAC unit is sized appropriately for the second single-precision mode.

However, even the above approach requires more bits (and thus more die area) than necessary. More specifically, as stated above, much of the capability of the first MAC unit is unused when performing packed single-precision operations. The SD MAC unit 450 supports both packed single and double precision operations with a smaller amount of total width and logic elements than the above-described approach and thus requires less die area than the above-described approach. The SD MAC unit 450 includes a low bit subunit 454 and a high bit subunit 452. The low bit subunit 454 is sized to support operations for a single-precision operand and the high bit subunit 452 is sized smaller than necessary to support operations for a double-precision operand, but larger than necessary to support operations for a single-precision operand. In the packed-single mode, the high bit subunit 452 and low bit subunit 454 operate independently, calculating results for the different single-precision operands. In the double-precision mode, the high bit subunit 452 calculates high bits of the result of operations for double-precision operands and the low bit subunit 454 calculates low bits of the result of operations for double-precision operands. In either mode, each side receives appropriate inputs (such as previous iteration calculations w[j], values T or t, or values rw[j] as described above) specific to the operand for which calculations are being performed.

Figure 4C:
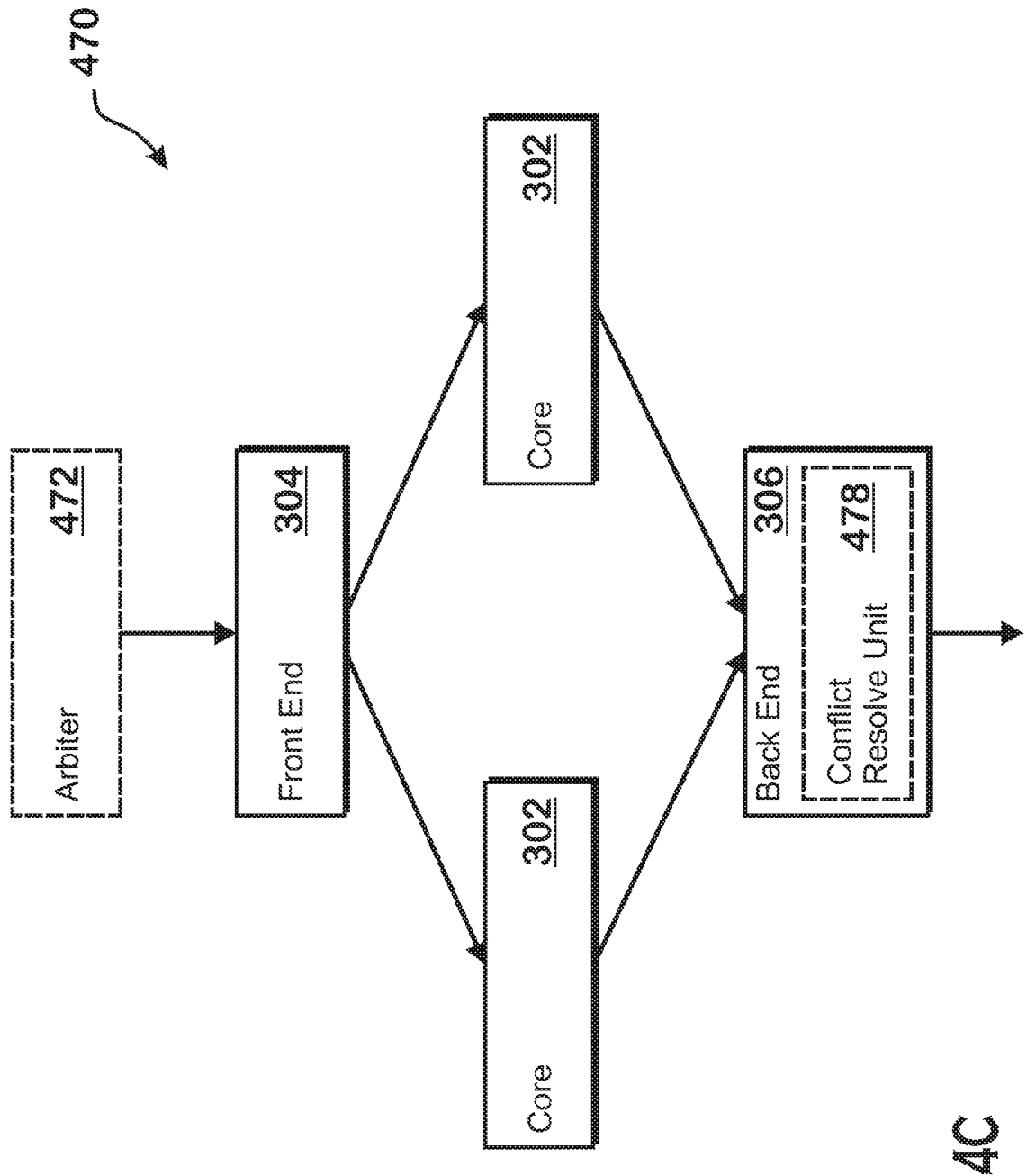
FIG. 4C is a block diagram of a shared division/square root unit for performing multiple division or square root operations simultaneously, according to an example.

FIG. 4C is a block diagram of a shared div/sqrt unit 470, according to an example. The shared div/sqrt unit 470 allows two operations to be performed at the same time. More specifically, the shared div/sqrt unit 470 is able to perform combinations of square root and division operations simultaneously.

To support such simultaneous execution, the shared div/sqrt unit 470 includes two cores 302, but a single front end 304 and a single back end 306. The two cores 302 allow simultaneous performance of the above-described iterations (e.g., calculation of w[j+1]) for calculating square root and division. Note that these iterations are the most cycle-intensive part of the square root and division operations because these iterations occur many times per square root or division calculation (e.g., a number of times sufficient to accumulate a result of a desired size from the digits of size $2^b$). Thus, duplicating the core 302, which performs these iterations, allows the bulk of the division or square root operations to be performed simultaneously.

First and second alternative mechanisms exist to prevent conflicts from occurring at the front end 304 and back end 306. In the first mechanism, an arbiter 472 sits "above" (e.g., before) the front end 304. The arbiter 472 receives division and square root instructions for execution by the remainder of the shared div/sqrt unit 470. The arbiter 472 determines a number of cycles required for execution of each instruction and schedules the received instructions such that the instructions do not conflict on the back end 306. The arbiter 472 keeps track of instructions already being processed by the shared div/sqrt unit 470 and the number of cycles required for completion of such instructions in order to determine whether a conflict would occur on the back end 306. Responsive to determining that an instruction to be submitted to the rest of the div/sqrt unit 470 would conflict at the back end 306 with another instruction, the arbiter 472 delays the instruction and schedules the instruction for execution at a subsequent cycle that would prevent conflict with the other instruction at the back end 306.

In the second mechanism, the back end 306 includes a conflict resolve unit 478. The cores 302 emit a signal that a division or square root calculation is ready for final processing by the back end 306 upon determining that an instruction has completed processing in the cores 302. The conflict resolve unit 478 examines these signals and, if two signals are received at the same cycle, causes results from one of the cores 302 to be delayed by a cycle and fed to the back end 306 in the next cycle.

The shared div/sqrt unit 470 allows for simultaneous execution of division and square root operations without a full duplication of the hardware (e.g., a full duplication of the combined div/sqrt unit 300). More specifically, only the core 302 is duplicated, while the front end 304 and back end 306 are shared. Because the core is occupied by a particular division/square root operation for many more cycles than the front end unit 304 or back end unit 306, non-duplication of the front end 304 and back end 306 only slows down operations for a relatively small amount of time. Non-duplication of the front end 304 and back end 306 requires less area than a full duplication of the shared div/sqrt unit 470.

Figure 5:
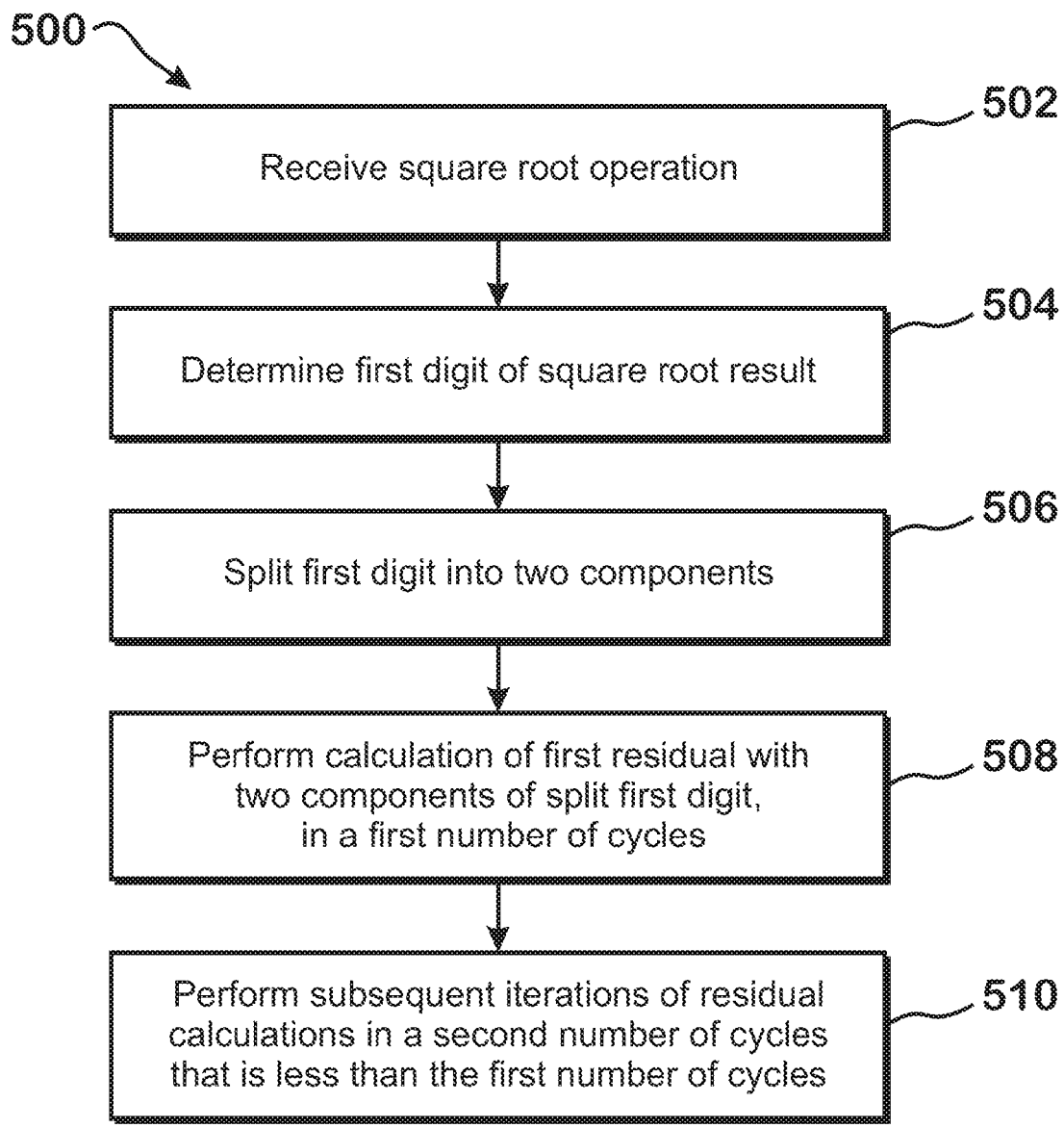
FIG. 5 is a flow diagram of a method for performing a square root operation, according to an example.

FIG. 5 is a flow diagram of a method 500 for performing a square root operation, according to an example. Although described with respect to the system shown and described with respect to FIGS. 1-3 and 4A-4C, it should be understood that any system configured to perform the method, in any technically feasible order, falls within the scope of the present disclosure.

As shown, the method 500 begins at step 502, where a combined div/sqrt unit 300 receives in indication to perform a square root operation. In one example, the combined div/sqrt unit 300 is part of a functional unit 216 of FIG. 2 and receives an indication to perform a square root operation from a reservation station 212 based on operations associated with instructions fetched by the instruction fetch unit 204 for execution.

At step 504, the combined div/sqrt unit 300 determines the first digit of the result of the square root operation, the first digit being Si as discussed above. In one approach, $s_1 = \text{floor}(\text{trunc}(2^k Mx) + 1/2)$. Note that this first digit $s_1$ has a larger number of bits (k bits) than the number of bits in the other digits (digits $s_2$ onwards—have b bits).

At step 506, the combined div/sqrt unit 300 splits the first digit into two components $s_{1a}$ and $s_{1b}$. Because operations using these two split components are performed in different cycles, a multiplexer, such as selector 414 (which receives Si via the recoder 402) selects bits for either of the two components in an appropriate cycle. In one example, a register stores an unselected portion of $s_1$ when the selected portion is used for calculations.

At step 508, the combined div/sqrt unit 300 performs calculation of the first residual value w[1] with the two split components of the first digit Si, in a first number of cycles. In one example, the first number of cycles is 4 and the operations for determining w[1] are performed as described above in the discussion of FIG. 4A. As described above, in the calculation of w[1], the $s_1$ term is squared. A direct calculation of $s_1^2$ would require a relatively large number of bits. Splitting the $s_1$ term into two components ($s_{1a}$ and $s_{1b}$) allows the calculation of w[1] to be performed with multiplications ($s_{1a}^2$, $s_{1a}s_{1b}$, and $s_{1b}^2$) that require a smaller number of bits than the multiplication of $s_1^2$. Because clock delay is limited based on the number of bits required for such multiplications, reducing the number of bits required for the multiplications reduces the amount of delay required for calculation of w[1]. This reduction allows the clock speed to be increased. Although there are more terms involved in calculation of w[1] as compared with a calculation of w[1] that calculates $s_1^2$ directly, and this greater number of terms leads to an increased cycle number requirement for the calculation of s[1], splitting $s_1$ allows the calculation of w[1] to not act as a bottleneck for the entire processor in terms of clock speed.

At step 510, the combined div/sqrt unit 300 performs subsequent iterations to calculate subsequent residual values. Each subsequent iteration takes fewer cycles than the first number of cycles used for calculating the first residual value. In one example, the subsequent iterations each take two cycles, as described above with respect to FIG. 4A.

Figure 6:
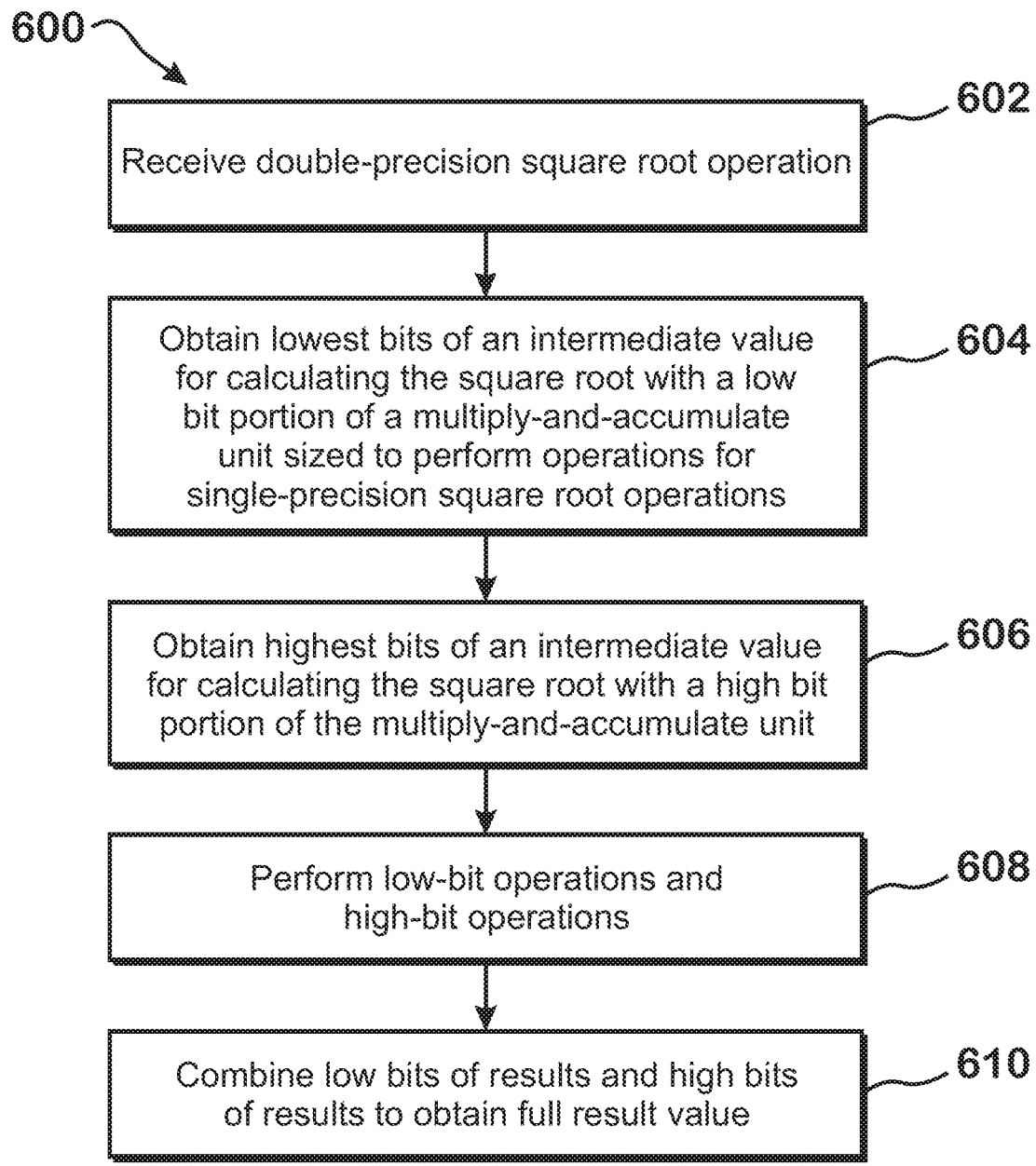
FIG. 6 is a flow diagram of a method for performing square root operations with a combined packed single/double precision multiply-and-accumulate unit, according to an example.

FIG. 6 is a flow diagram of a method 600 for performing square root operations with a combined packed single/double precision MAC unit 450, according to an example. Although described with respect to the system shown and described with respect to FIGS. 1-3 and 4A-4C, it should be understood that any system configured to perform the method, in any technically feasible order, falls within the scope of the present disclosure.

As shown, the method 600 begins at step 602, where a combined div/sqrt unit 300 receives a double-precision square root operation that specifies a double-precision number for which a square root value is desired. In an example, this operation is received from a reservation station 212 of FIG. 2 for execution per an instruction fetched by the instruction fetch unit 204 of FIG. 2.

At step 604, a low-bit subunit 454 of the multiply and accumulate unit 450 of the core 302 obtains low bit input of a value for which a multiply-and-accumulate operation is to be performed for the purpose of performing calculations for determining a square root of the double-precision number as described above with respect to FIG. 4A. One such operation is the cycle A, operation 2 computation of v[j+1] and another such operation is the cycle B, operation 2 computation of w[j+1].

At step 606, a high-bit subunit 452 of the MAC unit 450 obtains high bit input of a value for which a multiply-and-accumulate operation is to be performed for the purpose of performing calculations for determining a square root of the double-precision number as described above with respect to FIG. 4A.

The low-bit subunit 454 is sized large enough to perform operations for single-precision numbers but is not sized large enough to perform operations for double-precision numbers. The high-bit subunit 452 is sized larger than necessary to perform operations for single-precision numbers but not large enough to perform operations for double-precision numbers on its own.

At step 608, the low-bit subunit 454 performs operations to obtain the lowest bits of the result calculation and the high-bit subunit 452 performs operations to obtain the highest bits of the result calculation. At step 610, the MAC unit combines the low-bit results and the high-bit results to obtain a final value sized appropriately for square root calculations of double-precision numbers.

Figure 7:
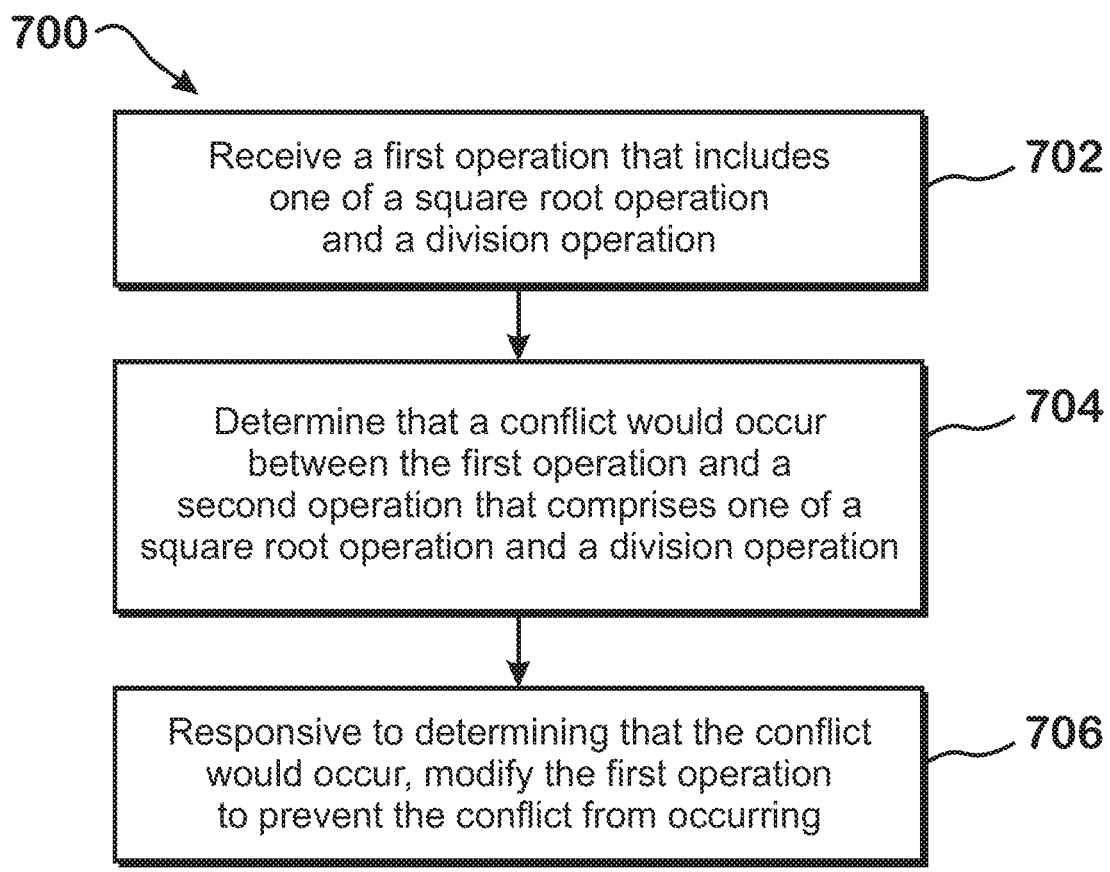
FIG. 7 is a flow diagram of a method for performing multiple square root or division operations simultaneously, according to an example.

FIG. 7 is a flow diagram of a method 700 for performing multiple square root or division operations simultaneously, according to an example. Although described with respect to the system shown and described with respect to FIGS. 1-3 and 4A-4C, it should be understood that any system configured to perform the method, in any technically feasible order, falls within the scope of the present disclosure.

As shown, the method 700 begins at step 702, where the combined div/sqrt unit 470 receives an operation that includes one of a square root operation and a division operation. At step 704, the combined div/sqrt unit 470 determines that a conflict would occur between the first operation and a second operation that includes one of a square root operation and a division operation. This second operation may already be executing in the combined div/sqrt unit 470, or may be received for execution simultaneously with the first operation. At step 706, the combined div/sqrt unit 470 modifies the first operation to prevent the conflict from occurring, responsive to the determination made at step 704.

In one example, steps 704 and 706 are performed by an arbiter 472. The arbiter 472 keeps track of operations in flight in the combined div/sqrt unit 470 and also keeps track of how many cycles such operations require to finish. If scheduling the first operation would cause both operations to use the back end unit 306 in the same cycle, the arbiter 472 delays the first operation so that such a conflict does not occur. In another example, steps 704 and 706 are performed by a conflict resolve unit 478 at the back end 306. The conflict resolve unit 478 determines whether two operations would finish at the same time and delays one of the operations if such an event would occur.

The techniques described herein improve square root operations in a computer processor. More specifically, a first iteration for calculating partial results of a square root operation is performed in a large number of cycles than remaining iterations. The first iteration requires calculation of a first digit that is larger than the subsequent digits. The first iteration thus requires multiplication of values that are larger than corresponding values for the subsequent other digits. By splitting the first digit into two parts, the required multiplications can be performed in less time than if the first digit were not split. Performing these multiplications in less time reduces the total delay for clock cycles associated with the first digit calculations, which increases the possible clock frequency allowed. Other improvements also include an improved multiply-and-accumulate unit for performance of either packed-single operations or double-precision operations that allows for such a multiply-and-accumulate unit to use less chip area, and improvements to a combined div/sqrt unit that allow for simultaneous execution of division and square root operations in a manner that uses less chip area.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing a first operation by calculating at least a portion of a square root result of an operand, the method comprising:
   receiving the operand;
   calculating a first digit of the square root result based on the operand;
   splitting the first digit into a first digit component and a second digit component;
   calculating a first residual value based on the first digit component and the second digit component, wherein calculating the first residual value is performed in a first number of computer clock cycles; and
   calculating subsequent residual values and subsequent digits of the square root result based on the first residual value, wherein calculating each subsequent residual value is performed in a second number of computer clock cycles, the second number of computer clock cycles being less than the first number of computer clock cycles.

2. The method of claim 1, wherein:
   the first digit of the square root result includes more bits than each of the subsequent digits of the square root result.

3. The method of claim 1, wherein:
   calculating the first residual value and the subsequent residual values is performed based on a scaling factor that allows each digit to be obtained by rounding.

4. The method of claim 1, wherein calculating the subsequent residual values comprises:
   rounding a prior residual value to obtain a digit of the square root result;
   computing an intermediate residual value based on the prior residual value, the digit of the square root result, and a scaled prior square root result estimate;

computing a scaled digit based on the digit and on a scaling factor;

computing the subsequent residual value based on the intermediate residual value, the scaled digit, and the digit; and computing a scaled square root result estimate based on the scaled prior square root result estimate and the scaled digit.

5. The method of claim 1, wherein calculating the first residual value comprises:

calculating a first intermediate scaled square root estimate as equal to a scaled first digit component that is calculated based on a scaling factor and the first digit component of the first digit;

calculating a first portion of the first residual value based on an initial residual value, the scaled first digit component, and the first digit component;

calculating a first scaled square root estimate based on the first intermediate scaled square root estimate and a scaled second digit component that is calculated based on the scaling actor and the second digit component of the first digit; and calculating the first residual value based on the first portion of the first residual value, the first scaled square root estimate, and the second digit component of the first digit.

6. The method of claim 1, wherein:

the first operand comprises a double-precision operand, and;

calculating the first residual value comprises performing a multiply-and-accumulate operation by:

calculating least significant bits of a subsequent intermediate result via a low bit portion of a multiply-and-accumulate unit, the low bit portion sized to perform operations for single-precision square root operations but not large enough to perform operations for double-precision square root operations, and calculating most significant bits of the subsequent intermediate result via a high bit portion of the multiply-and-accumulate unit, the high bit portion having a size larger than that for performing operations for single-precision square root operations but not large enough to perform operations for double-precision square root operations.

7. The method of claim 1, further comprising:

receiving a second operation that comprises one of a square root operation and a division operation;

determining that a conflict would occur between the second operation and the first operation; and responsive to the determining, modifying at least one timing aspect of the first operation or the second operation so that the conflict does not occur.

8. The method of claim 7, wherein:

determining that the conflict would occur comprises:

identifying a first number of cycles for completion of the first operation;

identifying a second number of cycles for completion of the second operation; and determining, at an arbiter of a combined division and square root core, that the first operation and the second operation would complete at the same cycle based on the first number of cycles for completion and the second number of cycles for completion.

9. The method of claim 7, wherein:

determining that the conflict would occur comprises:

determining, at a back end of a combined division and square root core, that the first operation would complete at the same time as the second operation.

10. A combined square root and division core for performing a first operation by calculating at least a portion of a square root result of an operand, the combined square root and division core comprising:

an input interface configured to receive the operand;

a rounding unit configured to calculate a first digit of the square root result based on the operand;

a selector configured to split the first digit into a first digit component and a second digit component; and a multiply-and-accumulate unit configured to:

calculate a first residual value based on the first digit component and the second digit component, wherein calculating the first residual value is performed in a first number of computer clock cycles; and calculate subsequent residual values and subsequent digits of the square root result based on the first residual value, wherein calculating each subsequent residual value is performed in a second number of computer clock cycles, the second number of computer clock cycles being less than the first number of computer clock cycles.

11. The combined square root and division unit of claim 10, wherein:

the first digit of the square root result includes more bits than each of the subsequent digits of the square root result.

12. The combined square root and division unit of claim 10, wherein:

the multiply-and-accumulate unit is configured to calculate the first residual value and the subsequent residual values based on a scaling factor that allows each digit to be obtained by rounding.

13. The combined square root and division unit of claim 10, wherein:

the multiply-and-accumulate unit is configured to calculate the subsequent residual values by:

rounding a prior residual value to obtain a digit of the square root result;

computing an intermediate residual value based on the prior residual value, the digit of the square root result, and a scaled prior square root result estimate;

computing a scaled digit based on the digit and on a scaling factor;

computing the subsequent residual value based on the intermediate residual value, the scaled digit, and the digit; and computing a scaled square root result estimate based on the scaled prior square root result estimate and the scaled digit.

14. The combined square root and division unit of claim 10, wherein:

the multiply-and-accumulate unit is configured to calculate the first residual value by:

calculating a first intermediate scaled square root estimate as equal to a scaled first digit component that is calculated based on a scaling factor and the first digit component of the first digit;

calculating a first portion of the first residual value based on an initial residual value, the scaled first digit component, and the first digit component;

calculating a first scaled square root estimate based on the first intermediate scaled square root estimate and a scaled second digit component that is calculated based on the scaling actor and the second digit component of the first digit; and calculating the first residual value based on the first portion of the first residual value, the first scaled square root estimate, and the second digit component of the first digit.

15. The combined square root and division unit of claim 10, wherein:

the first operand comprises a double-precision operand, and;

the multiply-and-accumulate unit is configured to calculate the first residual value by performing a multiply-and-accumulate operation that comprises:

calculating least significant bits of a subsequent intermediate result via a low bit portion of a multiply-and-accumulate unit, the low bit portion sized to perform operations for single-precision square root operations but not large enough to perform operations for double-precision square root operations, and calculating most significant bits of the subsequent intermediate result via a high bit portion of the multiply-and-accumulate unit, the high bit portion sized larger than that for performing operations for single-precision square root operations but not large enough to perform operations for double-precision square root operations.

16. The combined square root and division unit of claim 10, further comprising:

an arbiter configured to determine that a conflict would occur between a second operation that comprises one of a square root operation and a division operation and the first operation by:

identifying a first number of cycles for completion of the first operation;

identifying a second number of cycles for completion of the second operation; and determining that the first operation and the second operation would complete at the same cycle based on the first number of cycles for completion and the second number of cycles for completion.

17. The combined square root and division unit of claim 10, further comprising:

a conflict resolve unit configured to determine that a conflict would occur between a second operation that comprises one of a square root operation and a division operation and the first operation by:

determining that the first operation would complete at the same time as the second operation.

18. A central processing unit for performing a first operation by calculating at least a portion of a square root result of an operand, the central processing unit comprising:

an instruction fetch unit configured to fetch instructions for execution; and a combined square root and division core comprising:

an input interface configured to receive the operand;

a rounding unit configured to calculate a first digit of the square root result based on the operand;

a selector configured to split the first digit into a first digit component and a second digit component; and a multiply-and-accumulate unit configured to:

calculate a first residual value based on the first digit component and the second digit component, wherein calculating the first residual value is performed in a first number of computer clock cycles; and calculate subsequent residual values and subsequent digits of the square root result based on the first residual value, wherein calculating each subsequent residual value is performed in a second number of computer clock cycles, the second number of computer clock cycles being less than the first number of computer clock cycles.

19. The central processing unit of claim 18, wherein:
the first digit of the square root result includes more bits than each of the subsequent digits of the square root result.

20. The central processing unit of claim 18, wherein:
the multiply-and-accumulate unit is configured to calculate the first residual value and the subsequent residual values based on a scaling factor that allows each digit to be obtained by rounding.

* * * * *